No. 647,993. Patented Apr. 24, 1900.
J. SCHMIDT.
PROCESS OF MAKING CAPSULES.
(Application filed Aug. 29, 1899.)
(No Model.)
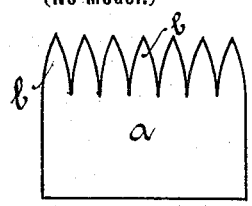
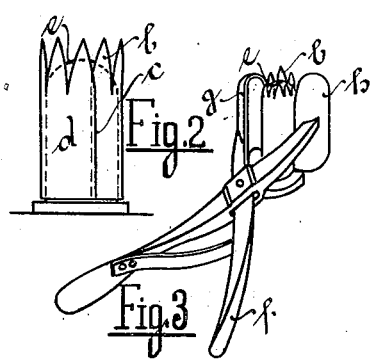
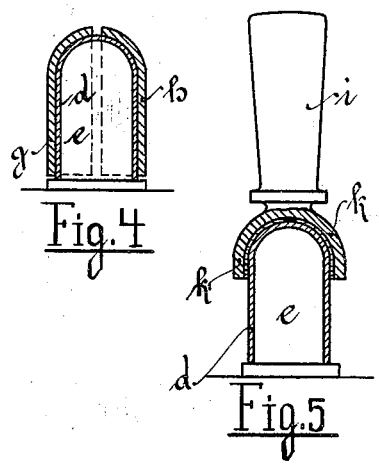
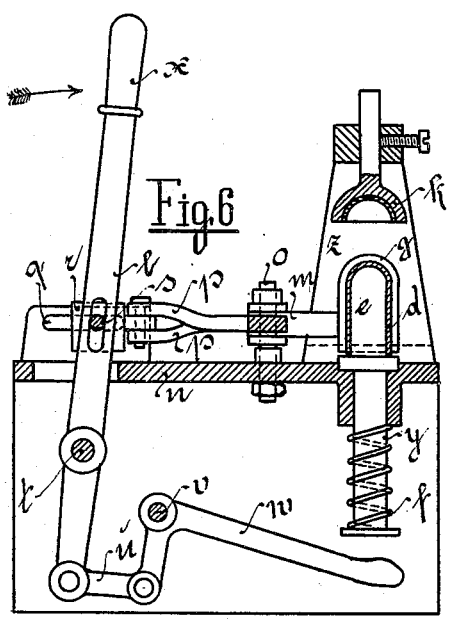
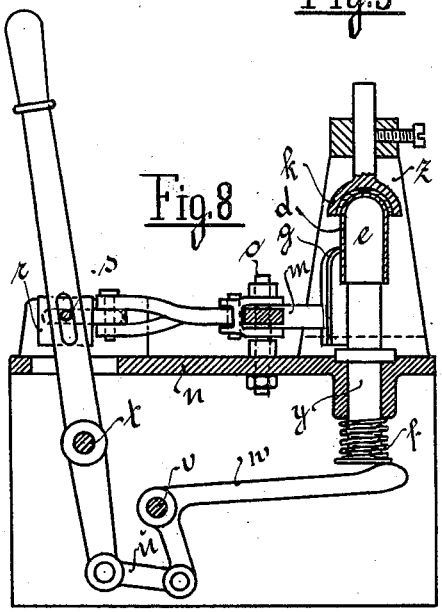
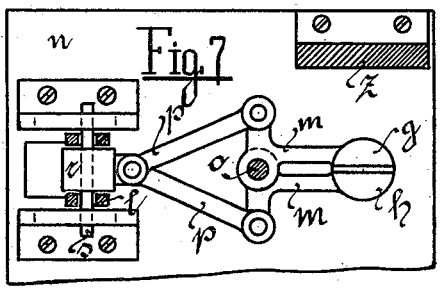
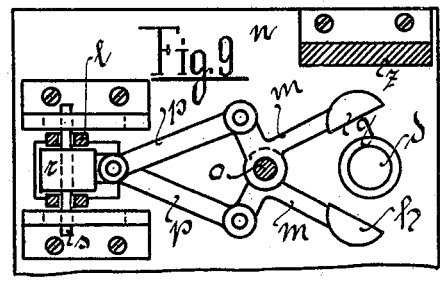
WITNESSES:
INVENTOR
Johann Schmidt
ATTORNEYS.
THE NORRIS PETERS CO., PHOTO-LITHO., WASHINGTON, D. C.

UNITED STATES PATENT OFFICE.

JOHANN SCHMIDT, OF NUREMBERG, GERMANY.

PROCESS OF MAKING CAPSULES.

SPECIFICATION forming part of Letters Patent No. 647,993, dated April 24, 1900.

Application filed August 29, 1899. Serial No. 728,869. (No specimens.)

*To all whom it may concern:*

Be it known that I, JOHANN SCHMIDT, a subject of the King of Bavaria, residing at Nuremberg, Kingdom of Bavaria, Germany, have invented a certain new and useful Process for Producing Capsules, of which the following is a description.

The present invention consists of a process for producing capsules for medicine-bottles and other purposes.

Hitherto the capsules of wafer material have been produced by either forming the same before they were baked or by effecting this subsequent to the baking or partial hardening process; but in both cases it has only been possible to produce proportionately-shallow capsules.

According to the present invention capsules of any desired depth may be easily produced from corresponding sheets of wafer material by first cutting a series of zigzags in the upper edge of a rectangular sheet, then bending the same to form a cylinder, and wetting the adjacent edges to cause them to stick together. The upper scalloped or zigzag edge, which is destined to form the upper rounded crown of the capsule, is then pressed onto a suitable form by means of a pressure-cap, and simultaneously the seam of the cylinder is compressed, so that it almost disappears, the material at the top and at the seam being approximately of uniform thickness with the rest of the capsule after the pressure part of the process has been carried out.

In order to render the present specification more easily intelligible, reference is had to the accompanying drawings, in which similar letters of reference denote similar parts throughout the several views.

Figure 1 is a plan of the piece of material cut ready for making the capsule; Fig. 2, an elevation of the cylinder formed therefrom; Fig. 3, a perspective elevation of the tongs for pressing the sheet around the form; Fig. 4, a section through the shell of the tongs and the capsule after it has been pressed around the form, and Fig. 5 a similar section showing the means for applying pressure to the crown after the operation illustrated in Figs. 3 and 4 has been carried out. Fig. 6 is a sectional elevation of a device for forming the capsule by means of a single lever, which is moved once backward and forward, the parts being in position to press the sheet of material around the form. Fig. 7 is a plan of Fig. 6. Fig. 8 is a similar elevation to that of Fig. 6, showing the formation of the crown of the capsule; and Fig. 9, a plan of the parts corresponding to the position shown at Fig. 8.

The upper edge of the sheet of material $a$ is notched or scalloped, as at $b$, and the sheet then bent to form a cylinder, Fig. 2. The scalloped upper edge is then bent over to form the crown of the capsule by means of the tongs $f$, Fig. 3, having correspondingly-shaped shell-halves $g$ and $h$, which fit over the form $e$, as shown in section at Fig. 4. After the material has thus been fitted around the form the pressure-cap $i$, Fig. 5, is applied thereto, which renders the material of the crown of an approximately-even thickness, and the capsule may be taken off the form, being ready for use.

The device shown in Figs. 6 to 9 is for making the capsules by means of a single lever at one operation. The hand-lever $l$, having the handle $x$, is pivotally mounted in the machine-frame $n$ at $t$ and is provided with a slot in which the pivot $s$ of a block $r$ may slide, the ends of the said pivot being guided in slots $q$ of stationary guide-blocks. To the block $r$ are pivotally connected the links $p\ p$ of the pivotally-mounted toggle-levers $m\ m$, at the free ends of which the shells $g$ and $h$ are mounted, said shells being pressed onto the form $e$ when the said hand-lever is pressed to the right in the direction of the arrow in Fig. 6. The form $e$ is mounted on a stem $y$, extending downwardly through the table $n$ and having a spring to normally hold the same in its lowest position, as indicated at $f$. The lower end of the lever $l$ is pivoted to a link $u$, the other end of which is pivoted to the short arm of the bell-crank lever $w$, the free end of which is adapted to contact with the lower end of the stem $y$ and force the form $e$ upwardly against the pressure of its spring $f$, as is illustrated at Fig. 8. A stationary but adjustable pressure-cap $k$ is mounted vertically above the form $e$, and the same may be adjusted vertically in the standard $z$ by means of a set-screw. Thus when the lever is reversed the toggle-joint will act to push apart the halves of the shell, and as soon as this has taken place the arm $w$ will lift the form by contact with the lower end of its stem, forcing the material on the same against the pressure-cap $k$. Thus the capsule will be formed by two movements of the lever $l$, the first serving to press the material around the form and the backward movement serving to raise the capsule against the pressure-cap and complete the formation of the same. The bell-crank lever $w$ is pivotally mounted at $v$.

I claim as my invention—

A process for producing capsules of wafer material for medicine and other bottles which consists in first scalloping the upper edge of a sheet of wafer material, then bending the sheet to form a cylinder having the scalloped edge at its upper end, and pressing the said edge around to form the crown of the capsule, and finally applying a pressure-cap to the same in the manner and for the purpose substantially as described.

In witness whereof I have hereunto set my hand in presence of two witnesses.

JOHANN SCHMIDT.

Witnesses:
CARL SCHMIDT,
OSCAR BOCK.